Patented Sept. 15, 1953

2,652,430

UNITED STATES PATENT OFFICE 2,652,430

PROCESS FOR THE PREPARATION OF N-SUBSTITUTED SATURATED DI-AMINES

Harry de V. Finch, Berkeley, and Seaver A. Ballard, Orinda, Calif., assignors to Shell Development Company, San Francisco, Calif., a corporation of Delaware No Drawing. Application February 13, 1950, Serial No. 144,026

7 Claims. (Cl. 260—583)

This invention relates to the preparation of amines. More particularly the present invention relates to a process for the preparation of N-substituted diamines wherein the amino groups are attached to different atoms in a chain of carbon atoms and wherein the amino nitrogen atoms are dissimilarly substituted. The invention relates still more particularly to a process for converting unsaturated 1,3-diamines in which one of the amino groups is bonded to an olefinic carbon atom at the end of a chain of carbon atoms which includes the carbon atom to which the second amino group is attached, to saturated diamines which differ essentially therefrom in the identity of the terminal groups or atoms that are bonded to at least one of the amino nitrogen atoms. Although in its broadest concepts not limited thereto, the invention is of particular value for the preparation of N-substituted alkylene diamines in which at least one of the amino nitrogen atoms is a secondary or a tertiary amino nitrogen atom and in which the two amino groups differ from each other in the number of the hydrogen atoms to which the respective nitrogen atoms are bonded.

The methods that have been employed heretofore for the synthesis of N-substituted alkylene diamines have in most cases involved application of the widely-known reactions that are generally applicable to the preparation of organic amines, particularly monoamines. These well-known reactions include, among others, the conversion of aliphatic halides to amines by reaction with ammonia or an amine, the conversion of nitroparaffins and of nitrogen derivatives, e. g., oximes, hydrazones, etc. of aldehydes and ketones to amines by reduction, the reduction of cyanides, the phthalimide synthesis, and the direct catalytic reaction between an alcohol and ammonia. In certain cases special methods have been proposed for the synthesis of diamines. However, these special methods frequently are not applicable to purposes other than their specific objects, and they frequently call for the use of special raw materials or specialized manipulative techniques that would render them of doubtful value as widely applicable methods for the preparation of diamines.

When it is desired to prepare a diamine in which the two amino groups differ in the identity of the terminal groups or atoms that are attached to the respective amino nitrogen atoms, the foregoing generally applicable methods are less effective, in some cases because of their limitation to the preparation only of primary amines, and in other cases because of the multiplicity of products that is obtained when one substitutes for the single amine or the ammonia that normally would be employed as the nitrogenous reactant, the mixture of nitrogenous reactants that would be required to form a diamine in which the amino groups differ from each other. An alternative approach, which comprises introducing the two amino groups into the molecule by successive reactions, ordinarily involves a sufficient number of intermediate steps for the preparation of the necessary intermediate compounds, to render it highly uneconomical and applicable only in special cases.

The present invention provides a direct, commercially applicable method for the synthesis of diamines of the hereindefined character in which at least one of the amino nitrogen atoms is a secondary or a tertiary amino nitrogen atom, and in which the two amino groups differ from each other. The process is adapted to the preparation of diamines wherein each amino group occupies a predetermined position in the molecule; the formation of undesired by-products is minimized, and the formation of a mixture of isomeric diamines, such as would be formed in certain of the prior methods referred to above, is substantially avoided. It is possible to prepare by means of the present process, a number of N-substituted 1,3-alkylenediamines that heretofore could have been prepared only with difficulty, if at all.

Broadly stated, the process to which the present inventoin relates comprises causing an unsaturated N-substituted 1,3-diamine containing an amino group that is bonded to an olefinic carbon atom that is at the end of a chain of carbon atoms which includes the carbon atom to which the second amino group is attached, the two amino groups most conveniently being substituted alike, to react, in the presence of a hydrogenation catalyst, with molecular hydrogen and with a compound containing an amino group that is directly attached to an atom of hydrogen and that differs in substitution from the amino group at the olefinic carbon atom in the diamine. According to the process of the invention, there is effected simultaneously interchange of at least the amino group that is attached to the olefinic carbon atom in the diamine reactant with the said amino group of the second-mentioned nitrogenous reactant, and saturation of the olefinic bond to produce a diamine wherein at least one of the N-substituted amino groups is said amino group of the second-mentioned nitrogenous reactant and wherein both of the amino groups are directly linked to saturated carbon atoms. The product of the reaction is in the preferred case a saturated diamine in which one of the amino groups corresponds to the said amino group of the second-mentioned reactant, or the "donor reactant" as it may, and occasionally will be referred to hereinafter for purposes of clarity and brevity. Thus, when ammonia is employed as the second amine reactant, the products of the reaction are N-substituted saturated diamines, e. g., alkanediamines, in which one of the amino nitrogen atoms is secondary or tertiary and the other is primary. When a primary or a secondary amine is employed as the second amine reactant, the primary or secondary amine being one that contains a substituted amino group that differs in substitution from the substituted amino groups of the N-substituted unsaturated diamine reactant, the products of the reaction are N-substiuted saturated diamines in which at least one of the N-substituted amino groups is the same as the N-substituted amino group of said primary or secondary amine reactant.

The process of the present invention is particularly valuable for the preparation of 1,3-alkanediamines wherein at least one of the amino nitrogen atoms is secondary or tertiary and the two amino groups differ from each other, as well as substitution products of such diamines wherein at least one of the hydrogen atoms of the alkane residue has been substituted by an organic group such as an aromatic, an aliphatic, an alicyclic or a heterocyclic group. When the process is thus applied, the essential reaction which occurs is thought to be as follows:

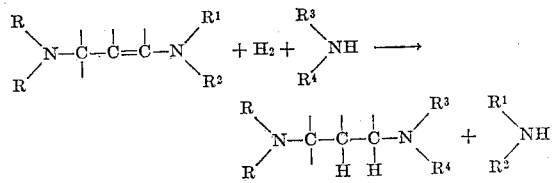

The reaction whereby both of the amino groups represented by —NR$_2$ and —NR$^1$R$^2$ are replaced by the amino group —NR$^3$R$^4$ of the donor reactant is included within the broader concepts of the invention. In this equation, each R and R$^1$ represents either a hydrogen atom or a hydrocarbon group and R$^2$ represents a hydrocarbon group. The groups or atoms represented by R, R$^1$, and R$^2$ may be the same or different. R$^3$ and R$^4$ represent either hydrogen atoms or hydrocarbon groups, R$^3$ and R$^4$ being either the same or different. R$^1$, R$^2$, R$^3$, and R$^4$ are so selected that the groups —NR$^1$R$^2$ and —NR$^3$R$^4$ differ from each other. The groups —NR$_2$ and —NR$^1$R$^2$ may be the same or different, although it generally is most convenient and preferable to employ as the diamine reactant an unsaturated diamine in which these groups are the same.

When reference is made herein to the second amine reactant, or the "donor reactant," as a compound containing an amino group that is directly attached through the nitrogen atom to an atom of hydrogen, the term "amino group" is employed in its broad sense in that it is intended to include both the unsubstituted amino group, —NH$_2$, and the amino groups wherein one or both of the hydrogen atoms may have been replaced by organic radicals, such as hydrocarbon radicals, i. e., it is intended to include the mono- valent group —NR$^3$R$^4$ in which the nitrogen atom is attached to three separate atoms by univalent bonds and in which each R$^3$ and R$^4$ represents either a hydrogen atom or a hydrocarbon group such as an aromatic, an aliphatic, or an alicyclic hydrocarbon group. Reference to compounds in which the amino group is attached to an atom of hydrogen designates those compounds in which the free valency in the group —NR$^3$R$^4$ is satisfied by an atom of hydrogen. When both R$^3$ and R$^4$ represent atoms of hydrogen, the formula HNR$^3$R$^4$ refers particularly to ammonia (NH$_3$). When one of R$^3$ and R$^4$ represents a hydrocarbon group and the other represents the hydrogen atom, the formula HNR$^3$R$^4$ refers particularly to the primary organic amines, and, similarly, when both R$^3$ and R$^4$ signify hydrocarbon groups, the formula HNR$^3$R$^4$ refers particularly to the secondary organic amines. A wide variety of primary and secondary organic amines may be employed in the process of the present invention, including saturated aliphatic amines, unsaturated aliphatic amines, aromatic amines, alicyclic amines and heterocyclic amines. R$^3$ and R$^4$ may be joined together to form a heterocyclic ring including the nitrogen atom of the amino group, as in piperidine and similar heterocyclic bases in which the nitrogen atom in the heterocyclic ring is attached to three separate atoms including an atom of hydrogen. Among the amines which may be employed in the process of the invention as the second amino reactant are included, among others, monoalkyl amines, dialkyl amines, monoalkenyl amines, dialkenyl amines, N-alkyl alkenylamines, aryl amines, diaryl amines, N-alkyl arylamines, N-alkenyl arylamines, cycloalkyl amines, heterocyclic amines, and the like. Specific amines which may be employed include, among others, methylamine, dimethylamine, cyclopentylamine, N-methylcyclopentylamine, allylamine, N-ethylallylamine, N-methylaniline, aniline, piperidine, 3-cyclohexenylamine, dicrotylamine, octylamine, N-decyloctylamine, N-allylaniline, furfuryl amine, methallylamine, octadecylamine, hexylamine, dihexylamine, N-octylaniline, benzylamine, and the like and homologous and analogous primary and secondary organic amines. The hydrocarbon group or groups attached to the amino nitrogen atom may be hydrocarbon groups which contain one or more substituents, provided such substituents do not interfere in any way with the successful practice of the process of the invention, such as one or more atoms of halogen, or groups including, for example, —O—, —OH, —S—, —NH—, —OC—, —SH, —OC—R, and the like, or, more preferably, they may be unsubstituted hydrocarbon groups.

As stated above, the process of the present invention is particularly valuable for the preparation of 1,3-alkanediamines and C-substitution products thereof, in which at least one of the amino nitrogen atoms is secondary or tertiary in character. N-substituted 1,3-alkenediamines which may be employed as the unsaturated diamine reactant in the process of the invention may be prepared by any suitable known or special method. 1-alkene-1,3-diamines wherein both of the nitrogen atoms are secondary amino nitrogen atoms and the terminal groups that are attached to the amino nitrogen atoms are aliphatic hydrocarbon groups containing at least three carbon atoms or are cycloaliphatic hydrocarbon groups, may be prepared conveniently by reacting an alpha, beta-olefinic aldehyde with a normally liquid-to-solid primary organic monoamine, according to the apparent equation:

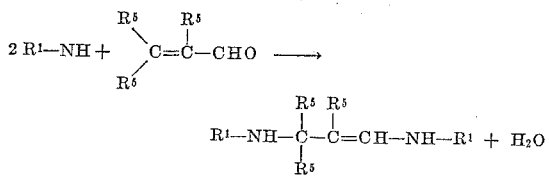

in which $R^1$ represents an aliphatic hydrocarbon group containing at least three carbon atoms, or a cycloaliphatic hydrocarbon group, and each $R^5$ represents either a hydrogen atom or an alkyl group. This reaction and a method for effecting it forms in part the subject matter of the copending application, Serial No. 759,474, filed July 7, 1947, now issued as U. S. Patent 2,565,488. Unsaturated diamines may be prepared according to the foregoing method by treating the unsaturated aldehyde with a normally liquid-to-solid aliphatic or cycloaliphatic primary amine at a temperature desirably not exceeding about $+20°$ C. and preferably within the range of from about $-30°$ C. to about $+20°$ C., in the liquid state in the presence of a substantial excess of the monoamine reactant under substantially anhydrous conditions. The unsaturated aldehyde and the amine may be mixed in proportions of from about 2 to 5 or more moles of the amine per mole of the unsaturated aldehyde and the mixture maintained at a reaction temperature within the stated range until the reaction is completed. A solid non-acidic desiccating agent, such as calcium oxide, magnesium oxide, potassium carbonate, activated alumina, or the like, may be contacted with the reaction mixture if desired, to favor the reaction. After completion of the reaction, the unsaturated diamine may be recovered from the reaction mixture in any suitable manner, fractional distillation being a generally applicable and preferred method of effecting the recovery.

Generally speaking, the unsaturated 1,3-diamines which may be employed as the diamine reactant in the process of the present invention may be represented by the structural formula

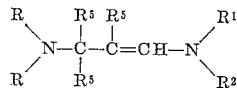

in which R and $R^1$ represent either hydrogen atoms or hydrocarbon groups, $R^2$ represents a hydrocarbon group, the groups $—NR_2$ and $—NR^1R^2$ preferably being the same, and each $R^5$ represents either a hydrogen atom or a hydrocarbon group, such as an aliphatic, an alicyclic, or an aromatic hydrocarbon group. Illustrative groups which may be represented by R, $R^1$, $R^2$, and $R^5$ include, for example, alkyl groups, e. g., methyl, ethyl, propyl, isopropyl, the butyls, the pentyls, and their straight-chain and branched-chain homologs, unsaturated aliphatic groups, such as allyl, methallyl, crotyl, 2-pentenyl, 2-methyl-2-pentenyl, 2-pentynyl, and homologs and analogs thereof, alicyclic groups, such as the phenyl group and the substituted phenyl groups, and the cycloaliphatic groups, such as cyclohexyl, cyclopentyl, cyclohexenyl, and homologous and analogous groups. The process of the invention is particularly effective when there is employed as the diamine reactant one in which the groups $—NR_2$ and $—NR^1R^2$ each contain from 2 to about 20 carbon atoms. The process is highly effective when the groups represented by R, $R^1$, and $R^2$ are non-aromatic, i. e., aliphatic or cycloaliphatic. It is particularly preferred to employ the unsaturated diamines within the present more general class in which there are present only aliphatic (non-aromatic) carbon-to-carbon bonds. The process may be executed with particular efficacy when the groups $—NR_2$ and $—NR^1R^2$ correspond to the amino groups of readily volatile amines $HNR_2$ and $HNR^1R^2$, e. g., amines having boiling points under atmospheric pressure up to about $200°$ C.

Particularly valuable conversions which may be effected by means of the present process include:

A. The conversion of ditertiary unsaturated diamines,

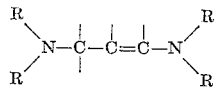

in which each R represents a hydrocarbon group, to:

1. Tertiary-secondary saturated diamines

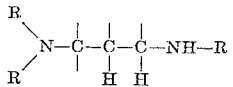

2. Tertiary-primary saturated diamines

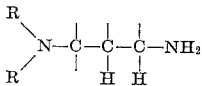

B. The conversion of disecondary unsaturated diamines,

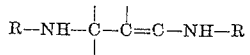

in which each R represents a hydrocarbon group, to:

1. Disecondary saturated diamines,

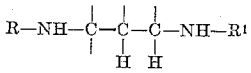

in which R and $R^1$ represent dissimilar hydrocarbon groups.

2. Secondary-primary saturated diamines

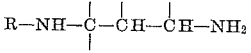

We have found that when the nitrogen atom of the monoamine reactant is bonded to the same number of hydrogen atoms as is each of the nitrogen atoms of the diamine, interchange of both of the amino groups of the diamine with the amino group of the monoamine also may occur. We have found further that when the nitrogen atom of the monoamine reactant is attached to a greater number of hydrogen atoms than is each nitrogen atom of the diamine, there is a substantially lesser tendency towards interchange of both of the amino groups of the diamine reactant.

The foregoing and like conversions of unsaturated diamines to saturated diamines which differ therefrom in the identity of the terminal groups or atoms that are attached to at least one of the amino nitrogen atoms, may be effected by heating in the presence of a hydrogenation catalyst and molecular hydrogen a mixture of the unsaturated diamine with an organic primary or secondary amine that contains the amino group to be interchanged with the amino group of the diamine, under conditions which favor the desired reaction. The selection of the organic primary or secondary monoamine will be based on the character of the amino group it is desired to introduce into the unsaturated diamine, according to the general equation for the reaction presented previously herein. The desired reaction may be effected by heating a mixture of the reactants in the liquid state in the presence of the hydrogenation catalyst and hydrogen at a temperature which is effective in causing the desired reaction to take place. The relative amounts of the unsaturated diamine and the organic primary or secondary monoamine that are employed may be varied within reasonable limits, although the desired reaction is favored by the presence of a moderate excess of the monoamine, or the "donor reactant." Generally speaking, molar ratios of unsaturated diamine to the primary or secondary monoamine of from about 10/1 to 1/50 are suitable. A preferred range comprises mole ratios of from about 1/1 to about 1/10.

As the hydrogenation catalyst, there may be employed any of the catalytically active metals or compounds of metals known to the art and generally referred to as hydrogenation catalysts, including, for example, the noble metals gold, platinum, palladium, etc., and base metals and compounds thereof and mixtures thereof, such as nickel, cobalt, tungsten, molybdenum, cerium, thorium, chromium, zirconium, and the like and compounds thereof, e. g., the oxides, sulfides, chromites, etc. Alloys or mixtures containing one or more of such metals, also may be employed. It is preferable to employ an effective catalyst that is relatively inexpensive and that is relatively easy to prepare and to regenerate or to reactivate. The base metal hydrogenation catalysts, consisting of or comprising a base metal, may be employed with particular advantage. The metal may be present either in a finely divided state and suspended in the reaction mixture, or deposited on an inert or catalytically active supporting material such as pumice, charcoal, silica gel, kieselguhr, or the like. Pyrophoric nickel, cobalt, and iron may be employed with particular advantage as hydrogenation catalysts because they possess an initial activity providing rapid reaction at conditions readily obtainable in practice, and because they may be easily prepared and regenerated or reactivated. Particularly favorable results may be obtained when there is employed as the hydrogenation catalyst in the present process the active catalyst known in the art as Raney nickel hydrogenation catalyst and prepared according to the disclosures of the Raney patent, U. S. 1,628,190.

In accordance with the invention, the unsaturated diamine is treated simultaneously with the second nitrogenous reactant, i. e., with ammonia or a primary or a secondary amine, and with hydrogen in the presence of a hydrogenation catalyst under conditions of elevated temperature and superatmospheric pressures of hydrogen which favor the desired reaction. The amount of the hydrogenation catalyst that most advantageously may be employed depends to a certain extent upon the activity of the particular catalyst that is used, and in part upon the particular nitrogenous reactants that are involved. Amounts of the hydrogenation catalyst from about 2 to about 20 per cent by weight of the reaction mixture are generally suitable, although larger or smaller amounts may be employed if desirable. When Raney nickel catalyst is employed as the hydrogenation catalyst, amounts from about 2 to about 10 per cent by weight of the reaction mixture generally are highly efficacious.

Temperatures in excess of about 50° C. are generally suitable. A preferred range of temperatures is from about 50° C. to about 300° C. A particularly suitable temperature range is from about 70° C. to about 130° C. The hydrogen pressure should be superatmospheric. Pressures of hydrogen of from about 500 to 10,000 pounds per square inch or more, up to the tensile limit of the reaction vessel, may be employed. Because of the desirable simplification in the requirements as to the necessary equipment, the lower pressures, say from about 500 to about 2,000 pounds per square inch, are preferred.

If desired, an inert solvent, such as an inert organic solvent, may be included in the reaction mixture. Solvents which may be employed include alcohols, ethers, esters, aliphatic hydrocarbons, aromatic hydrocarbons, and the like. When both the reactants and the products of the reaction are normally liquid at the reaction temperature and are mutually soluble or miscible, the reaction mixture conveniently may consist of the selected reactants and the hydrogenation catalyst. If the reaction mixture in the absence of a solvent does not form a homogeneous mixture, a sufficient amount of an inert solvent advantageously may be included in the mixture to render the several ingredients mutually compatible, or soluble. Larger amounts of solvent may be employed, if desired. The desired reaction is not dependent upon the use of other than a hydrogenation catalyst. However, the invention does not exclude as a matter of necessity the presence of other materials having catalytic activity, such as small amounts of acids, bases, acidic or basic salts, or the like.

The simultaneous treatment of the unsaturated diamine with the second nitrogenous reactant and the hydrogen may be effected in any suitable manner and in any suitable type of apparatus. The treatment may be either continuous, intermittent, or batchwise. If both of the nitrogenous reactants are normally liquids, they may be mixed in any suitable reaction vessel that is resistant to the pressures that are to be employed, the hydrogenation catalyst, e. g., in finely divided form, may be added to the mixture, and the mixture subjected to the action of the hydrogen under the aforesaid conditions of temperature and pressure. A mixture of the unsaturated diamine reactant and the donor reactant may be passed continuously over and/or through a bed of hydrogenation catalyst positioned in a suitable reaction chamber, in the presence of hydrogen gas under the aforesaid or equivalent conditions which favor hydrogenation reaction. If the second nitrogenous reactant is normally gaseous, it may be introduced into the reaction vessel either in the form of a solution in a suitable inert solvent, such as an inert organic solvent, or in the gaseous state. Conversion of the unsaturated diamine reactant to the corresponding saturated diamine, without exchange or replacement of an amino group, can be substantially avoided by operating in such a manner that exposure of the unsaturated diamine reactant to hydrogenating conditions in the absence of the second amine reactant is substantially precluded. This may be accomplished, for example, by bringing the unsaturated diamine and the second nitrogenous reactant into contact prior to introduction of the hydrogenation catalyst and/or the molecular hydrogen into the reaction vessel, by simultaneously introducing the two nitrogenous reactants into the reaction vessel, containing the hydrogen and the hydrogenation catalyst, or by first introducing the primary or secondary amine or ammonia, the hydrogen, and the hydrogenation catalyst into the reaction vessel and then, while maintaining the reaction conditions, introducing the unsaturated diamine reactant into the reaction vessel, preferably at a rate about corresponding to the rate of consumption of the diamine in the ensuing reaction.

A preferred embodiment of the invention may be illustrated by the preparation of 1,3-alkanediamines wherein the two amino nitrogen atoms are bonded to different numbers of hydrogen atoms, from N,N'-substituted 1-alkene-1,3-diamines which contain not more than the one carbon-to-carbon multiple bond and wherein the two amino nitrogen atoms are bonded to equal numbers of hydrogen atoms, e. g., from N,N'-dialkyl-1-alkene-1,3-diamines wherein the two alkyl groups are the same, N,N,N',N'-tetraalkyl 1-alkene-1,3-diamines wherein the two amino groups are the same, and heterocyclic 1-alkene-1,3-diamines wherein the amino nitrogen atoms form parts of like terminal heterocyclic rings, as in 1,3-bis(piperidino)propene and analogous heterocyclic 1-alkene-1,3-diamines. According to this preferred embodiment of the invention, the desired amount of the unsaturated diamine may be introduced into a suitable reaction vessel equipped with closable inlets and outlets, means for regulating the pressure within the reaction vessel, and heating means. The selected primary or secondary saturated monoamine is added to the reaction vessel, desirably in an amount substantially more than molecularly equivalent to the amount of the diamine, preferably in an amount from about 3 to about 10 or more moles of the monoamine per mole of the diamine. A hydrogenation catalyst is added, and molecular hydrogen is charged to the vessel while the temperature of the reaction mixture and the pressure of hydrogen are kept within the desired limits. When ammonia is employed as the second amino reactant, i. e., as the donor reactant, the substituted 1,3-propene-diamine may be placed in a suitable pressure-resistant vessel with a quantity of preferably anhydrous ammonia substantially greater than the amount theoretically required for the reaction, preferably fom about 3 to about 10 or more moles of ammonia per mole of the unsaturated diamine, and the mixture subjected to the action of molecular hydrogen in the presence of the hydrogenation catalyst under conditions which favor hydrogenation reaction, suitable conditions having been described hereinbefore. When the reaction has gone to substantial completion, the reaction vessel is cooled, the contents are withdrawn, and the products recovered by any suitable method, e. g., by removal of the catalyst by filtration, and fractionation of the organic amines that are present. It has been found that by employing relatively large excesses of the primary or secondary amine or the ammonia, i. e., of the "donor reactant," and that by operating in the presence of such an excess, there can be obtained efficient yields of the desired N-substituted 1,3-alkanediamine, wherein the two amino groups differ in substitution, with minimum formation of the substituted 1,3-alkanediamine that would be formed by direct hydrogenation of the initial unsaturated diamine reactant.

The following examples will illustrate certain of the numerous possible embodiments of the present invention. It will be appreciated that the examples are intended to be illustrative of and not limitative upon the scope of the invention as it is more broadly described and claimed herein. In the examples, the parts are by weight.

*Example I.—Conversion of a ditertiary unsaturated diamine to a tertiary-primary saturated diamine*

A solution of 31 parts of acrolein in 50 parts of diethyl ether was slowly added, with stirring, to a mixture of 94 parts of piperidine, 100 parts of diethyl ether and 50 parts of powdered potassium carbonate at 5° C. to 10° C. After the reaction was completed, the mixture was filtered and the ether was evaporated from the mixture, leaving a residue of 109 parts. The crude 1,3-bis(piperidino)propene thus prepared, 48 parts of anhydrous ammonia, and 5 parts of Raney nickel hydrogenation catalyst suspended in 10 parts of methyl alcohol, were introduced into a pressure resistant reaction vessel. The reaction vessel was closed from the atmosphere and subjected at 100° C. to the action of hydrogen gas at a pressure of 1600 pounds per square inch. After 2 hours the contents of the vessel were withdrawn and fractionally distilled. There were obtained 48 parts of 3-piperidinopropylamine, corresponding to a conversion of 61% based upon the amount of acrolein employed. The 3-piperidinopropylamine was found to contain 67.17 per cent C, 12.79 per cent H, and 19.45 per cent N, compared to calculated values of 67.6 per cent, 12.7 per cent and 19.7 per cent, respectively. Its specific gravity (20/4) was found to be 0.9024, and its refractive index ($n$ 20/D) was found to be 1.4757.

*Example II.—Conversion of a ditertiary unsaturated diamine to a tertiary-secondary saturated diamine*

A mixture of 80 parts of 1,3-bis(piperidino)-propene, 69 parts of isopropylamine and 8 parts of a slurry of Raney nickel hydrogenation catalyst in methanol, containing 5 parts of the catalyst, was subjected at 100° C. for two hours to the action of hydrogen gas under a pressure of 1000 pounds per square inch. The catalyst was removed from the mixture by filtration and the filtrate was fractionally distilled. N-isopropyl-3-piperidino-propylamine, 17 parts, was recovered as the fraction distilling at 77° C. to 80° C. under a pressure of 3 millimeters of mercury. The sample of this compound thus prepared was found to have the following characteristics:

| | Found | Calculated for $C_{11}H_{24}N_2$ |
|---|---|---|
| Equivalent weight | 93 | 92 |
| Refractive index ($n$ 20/D) | 1.4617 | |
| Density $d$ (20/4) | 0.8661 | |
| Carbon, percent weight | 71.32 | 71.75 |
| Hydrogen, percent weight | 13.12 | 13.05 |
| Nitrogen, percent weight | 14.85 | 15.20 |

*Example III.—Conversion of a ditertiary unsaturated diamine to a tertiary-secondary saturated diamine*

A mixture of 79 parts of 1,3-bis(piperidino)-propene, 70 parts of allylamine and 8 parts of a slurry of Raney nickel catalyst in methanol containing 5 parts of the catalyst, was subjected at 100° C. for two hours to the action of hydrogen gas under a pressure of 1000 pounds per square inch. Upon fractional distillation of the resultant mixture, there were recovered in a conversion of 51%, 36 parts of N-propyl-3-piperidinopropylamine having the characteristics shown in the following table.

N-PROPYL-3-PIPERIDINOPROPYLAMINE

| | Found | Calculated for $C_{11}H_{24}N_2$ |
|---|---|---|
| Equivalent weight | 91.4 | 92 |
| $n\ 20/D$ | 1.4638 | |
| Sp. Gr. 20/4 | 0.8690 | |
| Carbon, percent weight | 71.66 | 71.75 |
| Hydrogen, percent weight | 13.12 | 13.05 |
| Nitrogen, percent weight | 15.4 | 15.20 |
| Boiling Point, °C | 86–88 (3 mm.) | |

*Example IV.—Conversion of a disecondary unsaturated diamine to a secondary-primary saturated diamine*

A solution of 28 parts of acrolein in 32 parts of diethyl ether was added with stirring to 150 parts of isopropylamine at 5° C. to 10° C. Excess amine and the ether were evaporated from the mixture under reduced pressure, leaving a residue of 90 parts of crude N,N'-diisopropyl-1,3-propenediamine. A mixture of 90 parts of the N,N'-diisopropyl-1,3-propenediamine thus prepared, 52 parts of anhydrous ammonia, and 5 parts of Raney nickel catalyst was subjected at 100° C. for two hours to the action of hydrogen gas under a pressure of 2000 pounds per square inch. Upon fractional distillation of the resultant mixture, there were recovered, in a conversion of 64% based on the acrolein employed, 37 parts of N-isopropyl-1,3-propanediamine having the characteristics shown in the following table.

N-ISOPROPYL-1,3-PROPANEDIAMINE

| | Found | Calculated for $C_6H_{16}N_2$ |
|---|---|---|
| Carbon, percent weight | 62.04 | 62.0 |
| Hydrogen, percent weight | 13.76 | 13.8 |
| Nitrogen, percent weight | 24.45 | 24.2 |
| Equivalent weight | 58 | 58 |
| Sp. Gr. 20/4 | 0.8303 | |
| $n\ 20/D$ | 1.4417 | |
| Boiling Point, °C | 162 (760 mm.) | |

*Example V.—Conversion of a disecondary unsaturated diamine to a disecondary saturated diamine with interchange of one of the amino groups*

A mixture of 82.5 parts of N,N'-diisopropyl-1,3-propenediamine, 82 parts of ethylamine, and 5 parts of Raney nickel catalyst was subjected at 100° C. for two hours to the action of hydrogen gas under a pressure of 1000 pounds per square inch. Upon fractional distillation of the resultant mixture, there were recovered 36 parts of N-isopropyl-N'-ethyl-1,3-propanediamine having the characteristics shown in the following table.

N-ISOPROPYL-N'-ETHYL-1,3-PROPANEDIAMINE

| | Found | Calculated for $C_8H_{20}N_2$ |
|---|---|---|
| Carbon, percent weight | 66.7 | 66.7 |
| Hydrogen, percent weight | 13.9 | 13.9 |
| Nitrogen, percent weight | 19.2 | 19.4 |
| Equivalent weight | 72 | 72 |
| Sp. Gr. 20/4 | 0.8101 | |
| $n\ 20/D$ | 1.4348 | |
| Boiling Point, °C | 183 (760 mm.) | |

*Example VI.—Conversion of a disecondary unsaturated diamine to a disecondary saturated diamine with interchange of one of the amino groups*

To a mixture of 404 parts of 1,3-dimethylbutylamine and 36 parts of solid potassium hydroxide there were slowly added with stirring at 0° C. to 8° C., 112 parts of acrolein. After the addition of the acrolein was completed, the mixture was allowed to warm to room temperature and to stand for 3 hours. The supernatant phase was decanted from the small amount of lower phase and distilled, a forerun of 127 grams of low-boiling material and a cut of crude product amounting to 191 parts being collected separately. Redistillation of the crude product resulted in isolation of purified N,N'-di(1,3-dimethylbutyl)-1-propene-1,3-diamine having the properties shown in the following table.

N,N'-DI(1,3-DIMETHYLBUTYL)-1-PROPENE-1,3-DIAMINE

| | Found | Calculated for $C_{15}N_2H_{32}$ |
|---|---|---|
| Carbon, percent weight | 75.21 | 74.93 |
| Hydrogen, percent weight | 13.08 | 13.42 |
| Nitrogen, percent weight | 11.4 | 11.64 |
| Sp. Gr. 20/4 | 0.8192 | |
| Boiling Point, °C | 95 (0.5 mm. Hg) | |

A mixture of 62 parts of the N,N'-di(1,3-dimethylbutyl)-1-propene-1,3-diamine and 83 parts of isopropylamine was charged to an autoclave, and 5 parts of Raney nickel catalyst suspended as a slurry in a small amount of methanol were added. Hydrogen was charged to the autoclave at 1200 pounds per square inch (gauge) and the mixture was hydrogenated at 100° C. until absorption of hydrogen ceased. The catalyst was removed by filtration of the resulting mixture and the filtrate was fractionally distilled. N-(1,3-dimethylbutyl)-N'-isopropyl-1,3-propanediamine was recovered in a conversion of about 60% based upon the unsaturated diamine applied. The product had the following properties:

N-(1,3-DIMETHYLBUTYL)-N'-ISOPROPYL-1,3-PROPANEDIAMINE

| | Found | Calculated for $C_{12}N_2H_{28}$ |
|---|---|---|
| Carbon, percent weight | 72.15 | 71.93 |
| Hydrogen, percent weight | 13.98 | 14.09 |
| Nitrogen, percent weight | 13.6 | 13.98 |
| Basicity eq./100 g | 0.988 | 0.998 |
| Refractive Index $n\ 20/D$ | 1.4392 | |
| Sp. Gr. 20/4 | 0.8104 | |
| Boiling Point, °C | 89.0 under 5 mm. Hg | |

*Example VII.—Conversion of a disecondary unsaturated diamine to a secondary-primary saturated diamine*

A mixture of 76 parts of N,N'-diisopropyl-1-propene-1,3-diamine, 59 parts of anhydrous ammonia and 5 parts of Raney nickel catalyst suspended in a small amount of methanol was charged to an autoclave and treated with hydrogen gas under a pressure of 1500 pounds per square inch (gauge) and at 100° C. When absorption of hydrogen was complete, the products were withdrawn and fractionated, 27 parts of N-isopropyl-1,3-propanediamine being recovered.

*Example VIII.—Conversion of a ditertiary unsaturated diamine to a tertiary-primary saturated diamine*

To an autoclave there were charged 87 parts of N,N,N'N'-tetraethyl-1,3-propanediamine, which had been prepared by the reaction of acrolein with diethylamine, 42 parts of ammonia and 5 parts of Raney nickel catalyst suspended in a small amount of methanol. The mixture was treated with hydrogen for two hours under a pressure of 1800 pounds per square inch (gauge) at a temperature of 100° C. The catalyst was removed from the resulting mixture by filtration and the product was fractionally distilled. There were obtained 48.5 parts of N,N-diethyl-1,3-propanediamine distilling from 165° C. to 168° C., representing a 79% conversion to product. The N,N-diethyl-1,3-propanediamine after distillation was found to have the following properties:

N,N-DIETHYL-1,3-PROPANEDIAMINE

|  | Found | Calculated for $C_7H_{18}N_2$ |
|---|---|---|
| Hydrogen, percent weight | 13.85 | 13.93 |
| Carbon, percent weight | 64.45 | 64.56 |
| Nitrogen, percent weight | 21.4 | 21.5 |
| Basicity eq./100 g | 1.509 | 1.535 |
| Sp. Gr. 20/4 | 0.8265 |  |
| Refractive Index ($n$ 20/D) | 1.4413 |  |
| Boiling Point, °C | 169.5-170 |  |

This application is a continuation-in-part of our copending application Serial No. 759,472, filed July 7, 1947, now U. S. Patent 2,540,938.

We claim as our invention:

1. A process for preparing an N-substituted 1,3-alkanediamine of the general formula

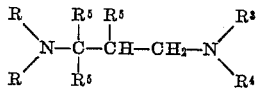

which consist of heating a N-substituted 1,3-alkenediamine of the general formula

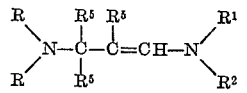

with a mole excess of an amino compound of the general formula

in the presence of added molecular hydrogen and in the presence of a hydrogenation catalyst at a temperature within the range of from about 50 to about 300° C. and under a hydrogen pressure within the range of from about 500 to about 10,000 pounds per square inch, in said formulae $R^2$ representing a non-aromatic hydrocarbon radical, R and $R^1$ representing a member of the group consisting of hydrogen and non-aromatic hydrocarbon radicals, $R^3$, $R^4$, $R^5$ representing a member of the group consisting of hydrogen and lower alkyl radicals, the members represented by $R^1$, $R^2$, $R^3$ and $R^4$ being so chosen that the groups represented in said formulae by —$NR^1R^2$ and $NR^3R^4$ differ from each other, and each of the groups represented in said formulae by —NRR and —$NR^1R^2$ contain from two to twenty carbon atoms.

2. The method of preparing N-isopropyl-N'-ethyl-1,3-propanediamine which comprises reacting one mole of N,N'-diisopropyl-1,3-propenediamine at a temperature of about 100° C. with about 3.5 moles of ethylamine in the presence of added molecular hydrogen under a pressure of about 1000 pounds per square inch and in the presence of Raney nickel hydrogenation catalyst and recovering said N-isopropyl-N'-ethylpropanediamine from the resulting mixture.

3. The method of preparing N,N-diethyl-1,3-propanediamine which comprises reacting one mole of N,N,N'N'-tetraethyl-1,3-propenediamine at a temperature of about 100° C. with about 4 moles of ammonia in the presence of added molecular hydrogen under a pressure of about 1800 pounds per square inch and in the presence of Raney nickel hydrogenation catalyst and recovering said N,N-diethyl-1,3-propanediamine from the resulting mixture.

4. The method of preparing N-isopropyl-1,3-propanediamine which comprises reacting one mole of N,N'-diisopropyl-1,3-propenediamine at a temperature of about 100° C. with about 5 moles of ammonia in the presence of added molecular hydrogen under a pressure of about 2000 pounds per square inch and in the presence of Raney nickel hydrogenation catalyst and recovering said N-isopropyl-1,3-propanediamine from the resulting mixture.

5. A process for preparing N,N-bis(lower alkyl)-1,3-propanediamine which comprises reacting one mole of N,N,N',N'-tetrakis(lower alkyl)-1,3-propenediamine at a temperature of from about 70° C. to about 130° C. with from about one to about ten moles of ammonia in the presence of added molecular hydrogen under a pressure of from about 500 to about 2000 pounds per square inch and in the presence of a nickel hydrogenation catalyst.

6. A process for preparing N-(lower alkyl)-1,3-propanediamine which comprises reacting one mole of N,N'-bis(lower alkyl)-1,3-propenediamine at a temperature of from about 70° C. to about 130° C. with from about one to about ten moles of ammonia in the presence of added molecular hydrogen under a pressure of from about 500 to about 2000 pounds per square inch and in the presence of a nickel hydrogenation catalyst.

7. A process for preparing an N,N-bis(lower alkyl)-N'-(lower alkyl)-1,3-propanediamine which comprises reacting one mole of an N,N',N'-tetrakis(lower alkyl)-1,3-propenediamine at a temperature of from about 70° C. to about 130° C. with from about one to about ten moles of a primary lower alkyl amine in the presence of added molecular hydrogen under a pressure of from about 500 to about 2000 pounds per square inch and in the presence of a nickel hydrogenation catalyst.

HARRY DE V. FINCH.
SEAVER A. BALLARD.

References Cited in the file of this patent

UNITED STATES PATENTS

| Number | Name | Date |
|---|---|---|
| 2,367,366 | Olin et al. | Jan. 16, 1945 |
| 2,540,938 | Finch et al. | Feb. 6, 1951 |

OTHER REFERENCES

Fieser et al.: "Organic Chemistry" (1944), p. 32.

Beckman et al.: "Catalysis" (1940), p. 657.

Singh et al.: "Chem. Abst.," vol. 41 (1947), p. 2420.

Mannich et al.: Berichte, vol. 69, pp. 2106-2123 (1936).